(12) United States Patent
Ebigt et al.

(10) Patent No.: US 8,539,787 B2
(45) Date of Patent: Sep. 24, 2013

(54) AIRCRAFT AIR-CONDITIONING SYSTEM FOR THE INDIVIDUAL AIR CONDITIONING OF REGIONS OF AN AIRCRAFT CABIN WITH A LIQUID COOLANT

(75) Inventors: Wolfgang Ebigt, Hamburg (DE); Stefan Repp, Hamburg (DE); Andreas Frey, Immenstadt (DE)

(73) Assignee: Airbus Deutschland GmbH, Hamburg (DE)

( * ) Notice: Subject to any disclaimer, the term of this patent is extended or adjusted under 35 U.S.C. 154(b) by 1018 days.

(21) Appl. No.: 11/848,760

(22) Filed: Aug. 31, 2007

(65) Prior Publication Data
US 2008/0053126 A1 Mar. 6, 2008

Related U.S. Application Data

(60) Provisional application No. 60/824,296, filed on Sep. 1, 2006.

(30) Foreign Application Priority Data

Sep. 1, 2006 (DE) .......................... 10 2006 041 030

(51) Int. Cl.
*B60H 1/32* (2006.01)
(52) U.S. Cl.
USPC ...................... 62/244; 297/180.15; 244/118.5
(58) Field of Classification Search
USPC .................... 62/244; 297/180.15; 244/118.5, 244/129.1, 122 R
See application file for complete search history.

(56) References Cited

U.S. PATENT DOCUMENTS

| | | | | |
|---|---|---|---|---|
| 5,513,500 | A * | 5/1996 | Fischer et al. | 62/239 |
| 5,795,018 | A * | 8/1998 | Schumacher et al. | 297/184.17 |
| 5,984,415 | A * | 11/1999 | Schumacher et al. | 297/411.2 |
| 6,845,627 | B1 * | 1/2005 | Buck | 62/185 |
| 6,973,799 | B2 * | 12/2005 | Kuehl et al. | 62/244 |
| 2003/0150594 | A1 * | 8/2003 | Futernik et al. | 165/43 |
| 2004/0139757 | A1 | 7/2004 | Kuehl et al. | |
| 2005/0264047 | A1 | 12/2005 | Bauer | |

FOREIGN PATENT DOCUMENTS

| | | |
|---|---|---|
| DE | 4340317 | 6/1995 |
| DE | 19830797 | 1/1999 |
| DE | 19947567 | 4/2001 |
| DE | 102004026023 | 12/2005 |
| EP | 1088696 | 4/2001 |
| JP | 2006-102061 | 4/2006 |
| WO | 2006034447 | 3/2006 |

* cited by examiner

*Primary Examiner* — Cheryl Tyler
*Assistant Examiner* — Lakiya Rogers
(74) *Attorney, Agent, or Firm* — Wood, Herron & Evans, LLP

(57) ABSTRACT

An aircraft air-conditioning system is disclosed, which includes at least one heat exchanger to which coolant circulating in a cooling circuit of a cooling system and air are fed. The coolant cools the fed air in the heat exchanger, and the air leaving the heat exchanger enters the aircraft cabin. The coolant of the cooling system is always in the liquid state in the cooling circuit. The liquid coolant can also cool an aircraft seat or a sitting area of the aircraft seat.

14 Claims, 2 Drawing Sheets

AIRCRAFT AIR-CONDITIONING SYSTEM FOR THE INDIVIDUAL AIR CONDITIONING OF REGIONS OF AN AIRCRAFT CABIN WITH A LIQUID COOLANT

TECHNICAL FIELD

The present invention relates to an aircraft air-conditioning system for the air conditioning of a region in an aircraft cabin, in particular for the individual air conditioning of a region, a liquid coolant being used as cooling medium.

BACKGROUND

In certain regions of an aircraft cabin a passenger and/or a plurality of passengers is/are allowed to adjust the temperature of this region individually and independently of other regions of the aircraft cabin. A region with an individual air conditioning may for example be a suite in a first-class compartment, a sleeping section and/or an aircraft seat. One or more persons may be accommodated in the region to be individually air conditioned.

FIG. 4 shows an aircraft cabin air-conditioning system of the prior art for the individual air conditioning of a region of an aircraft. At least one air supply line 104 which supplies cold air to the regions 102 to be individually air conditioned is placed under a floor 106 of an aircraft. A seat feed line 108 branches off the cold air from the air supply line 104 and supplies this via a nozzle 112 to the region to be individually air conditioned, i.e. an aircraft seat 102 and/or its surroundings. A passenger sitting on the aircraft seat 102 can adjust by means of an air feed valve 110 the amount of air fed to the region to be individually air conditioned.

The air supply lines 104 placed underneath the floor 106 must have a relatively large cross-section so that all zones to be individually air conditioned can be supplied with a sufficient amount of cold air. These air supply lines occupy a comparatively large amount of space, which is needed for other components of an aircraft. In addition such air supply lines 104 can due to their relatively large cross-section be laid only in certain places underneath the floor 106 of the aircraft. For this reason it is difficult to redesign or reconfigure the aircraft cabin. Furthermore, with this aircraft cabin air-conditioning system of the prior art the temperature of the fed air cannot be altered, but only the amount of air fed to the region to be individually air conditioned.

An object of the invention is to provide an improved aircraft air-conditioning system for the air conditioning of a region in an aircraft cabin.

SUMMARY OF THE INVENTION

This object is achieved by an aircraft air-conditioning system which includes at least one heat transfer device which cools at least one region in the aircraft cabin and to which coolant circulating in a cooling circuit of a cooling system is fed. The heat transfer device is associated with a region containing at least one person. The coolant of the cooling system is always in the liquid state in the cooling circuit.

The term "heat transfer device" includes any device that can transfer heat or cold. The heat transfer device can be configured as a heat exchanger or can temper a component of the aircraft, for example the sitting area of an aircraft seat. The region of the aircraft cabin can for example be a separate compartment, such as the first-class compartment mentioned before and/or the sleeping section mentioned before, the surroundings of an aircraft seat and/or the sitting area of an aircraft seat.

An aircraft air-conditioning system can include at least one heat exchanger to which coolant circulating in a cooling circuit of a cooling system and air are fed. The coolant in the heat exchanger cools the fed air, and the air leaving the heat exchanger enters the aircraft cabin. The coolant of the cooling system is always in the liquid state in the cooling circuit. In this embodiment the heat transfer device is designed as a heat exchanger.

Liquid-based cooling systems are increasingly being used in aircraft, with which for example food containers in the galley regions of an aircraft can be cooled. In such a liquid-based cooling system pumping devices and cooling equipment which supply coolant through a ducting system to heat exchangers installed in the galley regions, are arranged in the underfloor region, for example in the freight compartment. Such a system is described for example in DE 43 40 317 A1.

According to the invention it is now proposed to use such a liquid-based cooling system for cooling an aircraft cabin or regions of an aircraft cabin. This results, compared to a conventional aircraft cabin air-conditioning system of the prior art, which feeds cold air via air supply lines to a zone to be air conditioned, in a lower increase in weight of the aircraft, contrary to the expectations of the person skilled in the art. With a liquid-based aircraft air-conditioning system ducting with a smaller cross-section can be used, since with a liquid coolant significantly larger amounts of heat can be dissipated than by feeding cold air. The spatial requirements of the aircraft air-conditioning system are thereby also reduced. In addition the liquid coolant allows higher heat transfer coefficients than a gaseous coolant. Due to their smaller cross-section, the coolant lines of a liquid-based cooling system can be placed more flexible, i.e. can be placed with fewer restrictions in the aircraft, and can also supply such sites with a high cooling performance, which cannot be supplied by a conventional air-conditioning system.

In the aircraft air-conditioning system according to the invention the coolant of the cooling system is permanently in the liquid state in the cooling circuit. In this way a particularly space-saving aircraft air-conditioning system is provided, since both the coolant feed lines and coolant return lines can be designed with a small cross-section. Furthermore, when designing the heat transfer device or heat exchanger no thermodynamic constraints, for example the boiling point of the liquid coolant, have to be taken into account, which simplifies the integration of the aircraft air-conditioning system in an arbitrary aircraft cabin environment.

It is however also possible to construct the aircraft air-conditioning system in such a way that the liquid coolant vaporises in the heat exchanger.

The air supplied to the heat exchanger can be provided by a central air-conditioning system of the aircraft. Therefore, an air supply line from the central air-conditioning system to the region containing at least one person of the aircraft cabin has to be provided. In this case the at least one person in the region of the aircraft cabin is always provided with conditioned air from the central air-conditioning system.

The air fed to the heat exchanger can be drawn from the cabin. In this embodiment no air supply line is required, so that this embodiment is particularly space-saving and can be incorporated in a particularly flexible manner in an aircraft. This embodiment of the aircraft air-conditioning system uses no pre-conditioned air from the main air-conditioning unit of the aircraft.

In the aircraft air-conditioning system according to the invention the temperature of the air outputted by the heat exchanger can be adjusted. Furthermore the amount of air outputted by the heat exchanger can be adjusted. Since the temperature and the amount of the air leaving the heat exchanger can be adjusted individually, a passenger or a plurality of passengers in the region to be individually air conditioned is provided with a particularly high thermal comfort.

A valve by which the amount of coolant flowing through the heat exchanger can be adjusted, can be associated with the heat exchanger. The control of the valve can be carried out manually by a passenger or automatically depending on the desired temperature and/or the desired amount of air outputted by the heat exchanger.

The heat exchanger can be associated with a region containing at least one passenger in an aircraft cabin, wherein the temperature of the discharged air and/or the discharged amount of air can be individually adjusted for this region. The region of the aircraft cabin may for example be a first-class compartment, a sleeping section, an area for the crew and/or an aircraft seat to be air conditioned. Means for adjusting the set temperature of the air flowing into the region and/or means for adjusting the amount of air flowing into the region can be arranged in the region of the aircraft cabin. Since the passenger or the plurality of passengers can individually adjust the temperature of the air in the region in which they are accommodated, the passenger or passengers is provided with a particularly high degree of thermal comfort. The passenger or the plurality of passengers can in their region adjust the temperature of the air independently of other regions and/or independently of a central air-conditioning system, which feeds at least one region of an aircraft cabin with air-conditioned air.

The region to be individually air conditioned can be the surroundings of an aircraft seat. The heat exchanger can be arranged in the aircraft seat. The aircraft air-conditioning system can control the temperature of the aircraft seat and/or the temperature of the air in the surroundings of the aircraft seat.

The aircraft air-conditioning system can comprise a plurality of heat exchangers, each of which is associated with a region of the aircraft cabin, whereby the temperature of the discharged air and/or the amount of discharged air can be individually adjusted for each region. In each region of the aircraft cabin with which a heat exchanger is associated, means for adjusting a set temperature of the air flowing into the respective region and/or means for adjusting the amount of air flowing into the respective region can be arranged. Such an aircraft air-conditioning system supplies a plurality of regions of an aircraft cabin with coolant, wherein a passenger or a plurality of passengers being in a region can adjust the air temperature independently of the air temperature in the other regions. In this way the passengers is provided a particularly high and individual thermal comfort.

The aircraft air-conditioning system can be designed so that it operates independently of a central air-conditioning system, which supplies at least one region of the aircraft cabin with air-conditioned air. In this way, apart from a high degree of thermal comfort, a redundant air conditioning of at least one region of the aircraft cabin is achieved.

The at least one previously mentioned heat transfer device can be formed in or on a sitting area of an aircraft seat. The heat transfer device can include at least one line through which the liquid coolant flows. The heat transfer device is thermally coupled with the sitting area.

The at least one heat transfer device can be designed as a heat exchanger, wherein the coolant and air are fed to the heat exchanger, the fed air is cooled, and the air outputted by the heat exchanger flows into the interior of an aircraft seat.

A valve can be associated with the heat transfer device or the heat exchanger which is allocated to the aircraft seat, by which valve the amount of coolant flowing through the heat transfer device or the heat exchanger can be adjusted. The valve can be controlled manually by a passenger or automatically depending on the desired temperature and/or the desired amount of air outputted by the heat exchanger.

The invention also relates to a method for the air conditioning of at least one region in an aircraft cabin. Liquid coolant circulating in a cooling circuit of a cooling system is fed to a heat transfer device, which is associated with at least one region containing at least one person. The region containing at least one person may for example be an aircraft cabin, a part thereof, and/or a region of an aircraft seat. The coolant is always in the liquid state in the cooling circuit of the cooling system.

Air can flow through the heat transfer device configured as a heat exchanger, and the air cooled by the heat exchanger flows into a cabin. Cabin air can be fed to the heat exchanger.

The method can be adapted corresponding to the aforedescribed modifications of the aircraft air-conditioning system.

A further aspect of the invention relates to the use of a cooling system, in which a coolant circulating in a cooling circuit is always in the liquid state, for tempering at least one region of an aircraft cabin with which at least one person is associated.

BRIEF DESCRIPTION OF THE DRAWINGS

The invention is now described in more detail with reference to the accompanying diagrammatic drawings, in which.

DETAILED DESCRIPTION

Figure 1:
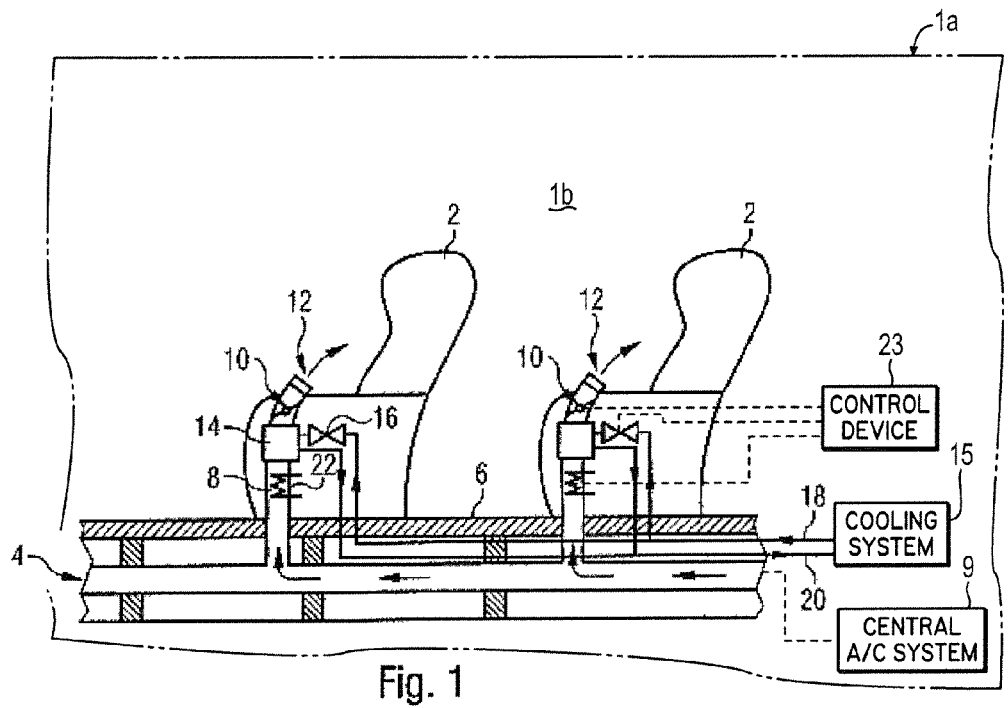
FIG. 1 is a first embodiment of the aircraft air-conditioning system, in which air is fed from an air supply line to a heat exchanger.

FIG. 1 shows a plurality of aircraft seats 2, which are arranged on a floor 6 of an aircraft cabin 1b of an aircraft 1a. Each aircraft seat 2 and/or its surroundings forms a region that is to be individually air conditioned.

The aircraft seat 2 includes a seat feed line 8, which branches off air from an air supply line 4. The air supply line 4 can be connected to a central air-conditioning system 9 of the aircraft, which provides fresh air and/or a mixture of fresh air and recirculated air. A heating device 22, for example an electrical heating device, is arranged in the seat feed line 8 in order to heat the air in the seat feed line 8 according to the wishes of a passenger. In addition a heat exchanger 14 is located in the seat feed line 8, by means of which the air in the seat feed line 8 can be cooled. An air feed valve 10 arranged in the seat feed line 8 can control the amount of air discharged through a nozzle 12.

The heat exchanger 14 is connected to a so-called low temperature bus cooling system 15. The low temperature bus is a bus-type cooling system 15 which feeds liquid coolant via a feed line 18 and a valve 16 to the heat exchanger 14. The low temperature bus 15 supplies a plurality of heat exchangers with liquid coolant, in which connection the plurality of heat exchangers can be arranged in parallel and/or in series in the low temperature bus 15. The heat exchanger 14 can discharge the coolant in the gaseous or liquid state into a return line 20. Since a liquid coolant can dissipate relatively large amounts of heat, the feed line 18 for liquid coolant can be designed having a relatively small cross-section, whereby it can be placed in a relatively flexible manner underneath the floor 6 of a cabin 1b of an aircraft 1a.

A temperature controller in the form of the heating device 22 for adjusting the set temperature of the air leaving the nozzle 12 as well as a flow controller in the form of the air feed valve 10 for adjusting the amount of air leaving the nozzle 12 can be provided at the aircraft seat 2. A control device 23 controls the heating device 22, the valve 16 and the air feed valve 10 in such a way that air at the desired temperature as well as in the desired amount exits from the nozzle 12. Instead of the control device 23, a regulating device (not shown) and sensors (not shown) for determining the temperature and the amount of air leaving the nozzle 12 can also be provided. In this case the passenger in the aircraft seat 2 is provided with a particularly high degree of thermal comfort. The heating device 22, the heat exchanger 14, the valve 16 and the air feed valve 10 can be arranged in the region, for example in the aircraft seat 2, to be individually air conditioned.

Figure 2:
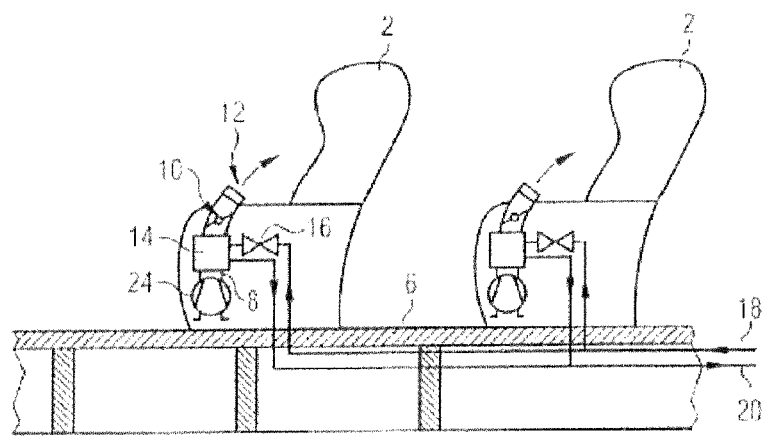
FIG. 2 is a second embodiment of the invention, in which cabin air is fed to a heat exchanger.

FIG. 2 shows a second embodiment of the invention, in which identical or similar parts are identified by the same reference numerals. The second embodiment of the invention does not include an air supply line 4. A drawing device 24 supplies cabin air to the seat feed line 8. A fan (not shown) can be arranged in the seat feed line 8 in order to generate an air flow in the seat feed line 8. The air in the seat feed line 8 flows through a heat exchanger 14, where it is cooled by a liquid coolant, which is fed through a feed line 18 of a low temperature bus. The coolant is discharged in the gaseous or liquid state from the heat exchanger 14 by means of a return line 20 of the low temperature bus. A valve 16 controls the amount of the liquid coolant flowing into the heat exchanger 14. An air feed valve 10 controls the amount of air discharged by the nozzle 12. Otherwise, the second embodiment according to FIG. 2 corresponds to the first embodiment according to FIG. 1. The second embodiment can, like the first embodiment, include a heating device in the seat feed line.

Since the second embodiment in contrast to the first embodiment does not include an air supply line 4, the second embodiment can be used in a particularly flexible manner for the air conditioning of an aircraft cabin and/or a region thereof. At least one feed line 18 and a return line 20 of a low temperature bus simply have to be placed underneath the floor 6 of a cabin of the aircraft.

Figure 4:
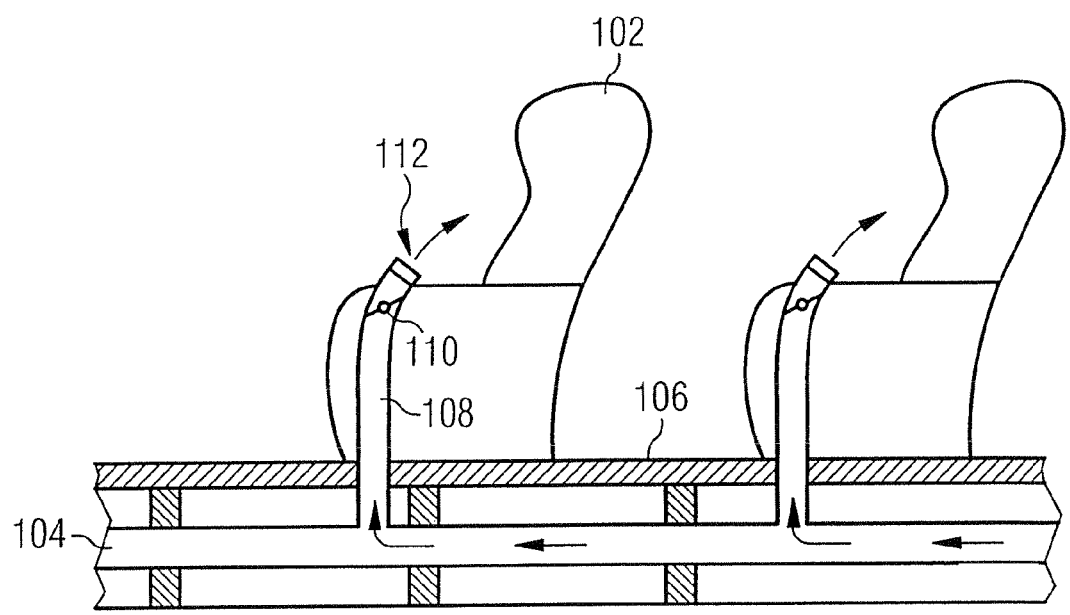
FIG. 4 is an aircraft air-conditioning system according to the prior art.

Reference is now made again to FIG. 4. In an aircraft air-conditioning system of the prior art an air supply line 104 is, as already mentioned before, provided in order to air condition regions of an aircraft cabin, for example the aircraft seat 102 and/or its immediate environment. Since air can dissipate only a relatively small amount of heat, the air supply line 104 in an air-conditioning system of the prior art must have a suitably large cross-section. Reference is again made to FIG. 2. In contrast to an air-based aircraft air-conditioning system of the prior art, the second embodiment of the aircraft air-conditioning system according to the invention includes the feed line 18 for liquid coolant and the return line 20 of a low temperature bus. Since liquid coolant can dissipate significantly more heat than a gaseous coolant, the feed line 18 and the return line 20 have a significantly smaller cross-section than the air supply line 104 of an aircraft air-conditioning system of the prior art. Other components of an aircraft accordingly have more available space. In addition the arrangement of the aircraft seats 2 can easily be altered, since only the feed line 18 and the return line 20 have to be placed anew and, due to their relatively small cross-section, spatial restrictions have to be taken into account only to a small extent.

The first embodiment and the second embodiment have been discussed on the basis of an aircraft seat 2, in which connection the aircraft seat 2 and/or its surroundings constitute a region of an aircraft cabin to be individually air conditioned with which a passenger is associated. It is to be understood that the features of the invention illustrated for the aircraft seat 2 can also be applied to other regions to be individually air conditioned. Such a region to be individually air conditioned includes for example a first-class compartment, a sleeping section, an area for the crew and the like. It is to be understood that these regions can also each be associated at least one person. The liquid coolant of the low temperature bus can also be used to cool a refrigerator or water cooler associated with the region of the aircraft cabin to be individually air conditioned.

Each region to be individually air conditioned can accommodate at least one passenger. The passenger or passengers in the region to be individually air conditioned can adjust the temperature in the corresponding region independently of the temperature of other regions of the aircraft cabin. A central air-conditioning system can be provided for replacing the air in the region to be individually air conditioned.

Figure 3:
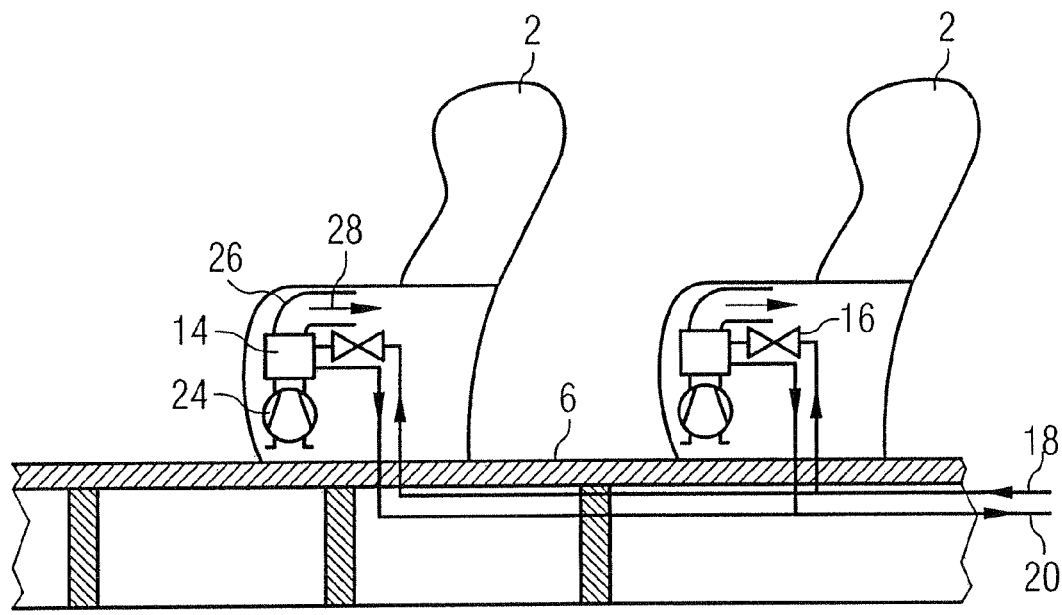
FIG. 3 is a third embodiment of the invention, in which an aircraft seat is tempered.

FIG. 3 shows a third embodiment of the invention, in which an aircraft seat 2 is itself tempered. A suction device 24 draws air from the interior of the aircraft seat 2, the air being cooled in a heat exchanger 14 by liquid coolant and returned through an air outlet 26 into the aircraft seat 2. A fan can be arranged between the suction device 24 and the air outlet 26 in order to generate an air flow through the heat exchanger 14. Furthermore, a heating device (not shown) can be arranged between the suction device 24 and the air outlet 26 in order to discharge heated air into the interior of the aircraft seat 2. The mode of operation of the third embodiment corresponds in other respects substantially to the mode of operation of the second embodiment. The third embodiment can also be combined with the first embodiment or with the second embodiment.

Further, in the third embodiment the coolant/air heat exchanger 14 is not necessary. Hose lines (not shown) can be arranged in the aircraft seat 2, in which lines circulates the liquid coolant of the low temperature bus. The hose lines form a heat transfer device. The heat transfer device is thermally coupled to a sitting area or reclining area of the aircraft seat.

The invention has been explained in such a way that air is cooled by means of a liquid coolant in a heat exchanger 14. It is however also conceivable that a refrigerating machine (chiller) is associated with the region of an aircraft cabin to be air conditioned, the machine releasing its waste heat, produced for example by condensation, to the liquid coolant. In this way temperatures can be reached in the region to be air conditioned that are lower than the temperature of the liquid coolant.

The invention has the advantage that the feed line 18 for liquid coolant and the return line 20 of the low temperature bus require less space than an air supply line 104 of an aircraft air-conditioning system of the prior art. The aircraft air-conditioning system according to the invention can therefore be installed relatively easily in an aircraft. Due to the relatively small cross-section of the feed line 18 for liquid coolant and the return line 20 of the cold bus, the cabin can be reconfigured relatively easily, since fewer spatial limitations have to be taken into account compared with an aircraft air-conditioning system of the prior art.

The region to be individually air conditioned can accommodate an arbitrary number of persons, for example passengers and/or crew members.

The aircraft air-conditioning system according to the invention can be configured so that the coolant in the feed line 18 and in the return line 20 is in the liquid state. It is however also conceivable for the coolant in the return line 20 to be in the gaseous state.

If the coolant in the cooling circuit is always in the liquid state, then the aircraft air-conditioning system can be configured particularly easily, since no thermodynamic constraints have to be taken into account. In this case it simply has to be ensured that the temperature of the liquid coolant flowing into the heat exchanger 14 is lower than the lowest set temperature of the region of the aircraft cabin to be air conditioned.

A water-propylene glycol mixture or a water-glycol mixture can for example be used as coolant.

The invention claimed is:

1. An aircraft with an air-conditioning system, comprising:
   an aircraft cabin having a plurality of regions and a plurality of seats, including a first region that surrounds a first seat, the first seat sized to accommodate a seated passenger;
   at least one heat transfer device configured as a heat exchanger, which is associated with and cools the first region, and to which is fed a coolant circulating in a cooling circuit of a cooling system, wherein the coolant of the cooling system is always in a liquid state in the cooling circuit;
   a central air-conditioning system operatively connected to the heat exchanger and supplying air to the heat exchanger, wherein the coolant in heat exchanger cools the air, and the air leaving the heat exchanger flows into the aircraft cabin;
   a first seat feed line located within the first seat and connected to the central air-conditioning system, the first seat feed line discharging air from the central air-conditioning system into the first region; and
   a heating device that heats the air flowing into the first region, the heating device and the heat exchanger each being located within the first seat feed line,
   wherein a temperature of the discharged air and or an amount of discharged air is configured to be individually adjusted for the first region.

2. The aircraft with an air-conditioning system according to claim 1, wherein the heat exchanger and the heating device are configured to adjust the temperature of the air leaving the heat exchanger.

3. The aircraft with an air-conditioning system according to claim 1, further comprising:
   an air feed valve in the first seat feed line, wherein the air feed valve is configured to adjust the amount of air leaving the heat exchanger.

4. The aircraft with an air-conditioning system according to claim 1, further comprising:
   a valve associated with the heat exchanger, the valve being configured to adjust an amount of coolant flowing through the heat exchanger.

5. The aircraft with an air-conditioning system according to claim 1, wherein the heat exchanger and the heating device are arranged in series flow relationship.

6. The aircraft with an air-conditioning system according to claim 1, wherein the heat exchanger operatively communicates at least one of:
   the heating device for adjusting a set temperature of the air flowing into the first region, and
   an air feed valve for adjusting the amount of air flowing into the first region.

7. The aircraft with an air-conditioning system according to claim 1, wherein the aircraft air-conditioning system includes a plurality of heat exchangers, each of which is associated with one of the plurality of regions in the aircraft cabin, wherein the temperature of the discharged air and/or the amount of discharged air is configured to be adjusted individually for each region.

8. The aircraft with an air conditioning system according to claim 7, wherein each heat exchanger associated with at least one of the plurality of regions operatively communicates with at least one of:
   the heating device for adjusting a set temperature of the air flowing into the at least one of the plurality of regions, and an air feed valve for adjusting the amount of air flowing into the at least one of the plurality of regions.

9. The aircraft with an air-conditioning system according to claim 1, wherein the heat exchanger and the heating device are configured to operate independently of the central air-conditioning system that supplies at least one region of the aircraft cabin with conditioned air, thereby providing individual control of conditioned air at the first region.

10. The aircraft with an air-conditioning system according to claim 1, wherein the discharged air leaving the heat exchanger enters an interior of the first seat.

11. The aircraft with an air-conditioning system according to claim 1, wherein the at least one heat exchanger is arranged in a sitting area of the first aircraft seat.

12. A method for air conditioning of a first region of a plurality of regions in an aircraft cabin, the first region surrounding a first aircraft seat sized to accommodate a seated passenger, the method comprising:
    circulating coolant in a cooling circuit of a cooling system, wherein the coolant of the cooling system is always in a liquid state in the cooling circuit;
    routing the circulating coolant to at least one heat transfer device configured as a heat exchanger, which is associated with the first region; and
    supplying air from a central air-conditioning system of the aircraft through a first seat feedline within the first aircraft seat, the heat exchanger being located in the first seat feed line such that the air flows through the heat exchanger to cool the air;
    discharging the air cooled by the heat exchanger from the first seat feed line into the first region of the aircraft cabin; and
    heating air flowing through the first seat feed line with a heating device located in the first seat feed line,
    wherein a temperature of the discharged air and/or an amount of discharged air configured to be individually adjusted for the first region.

13. The method according to claim 12, further comprising:
    controlling with a control device each of the heating device, the heat exchanger, and an air feed valve controlling flow in the first seat feed line in order to adjust the temperature and/or the amount of air discharged into the first region.

14. The aircraft with an air conditioning system according to claim 1, further comprising:
    a control device operatively coupled to each of the heating device, the heat exchanger, and an air feed valve controlling flow in the first seat feed line, the control device configured to adjust the temperature and/or the amount of air discharged into the first region.

* * * * *